UNITED STATES PATENT OFFICE.

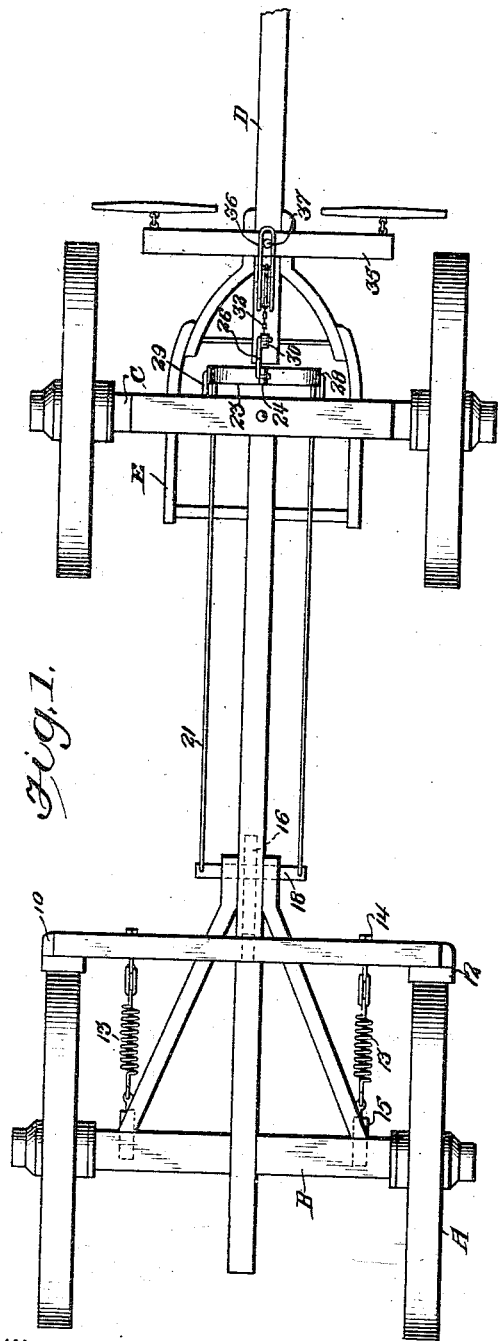

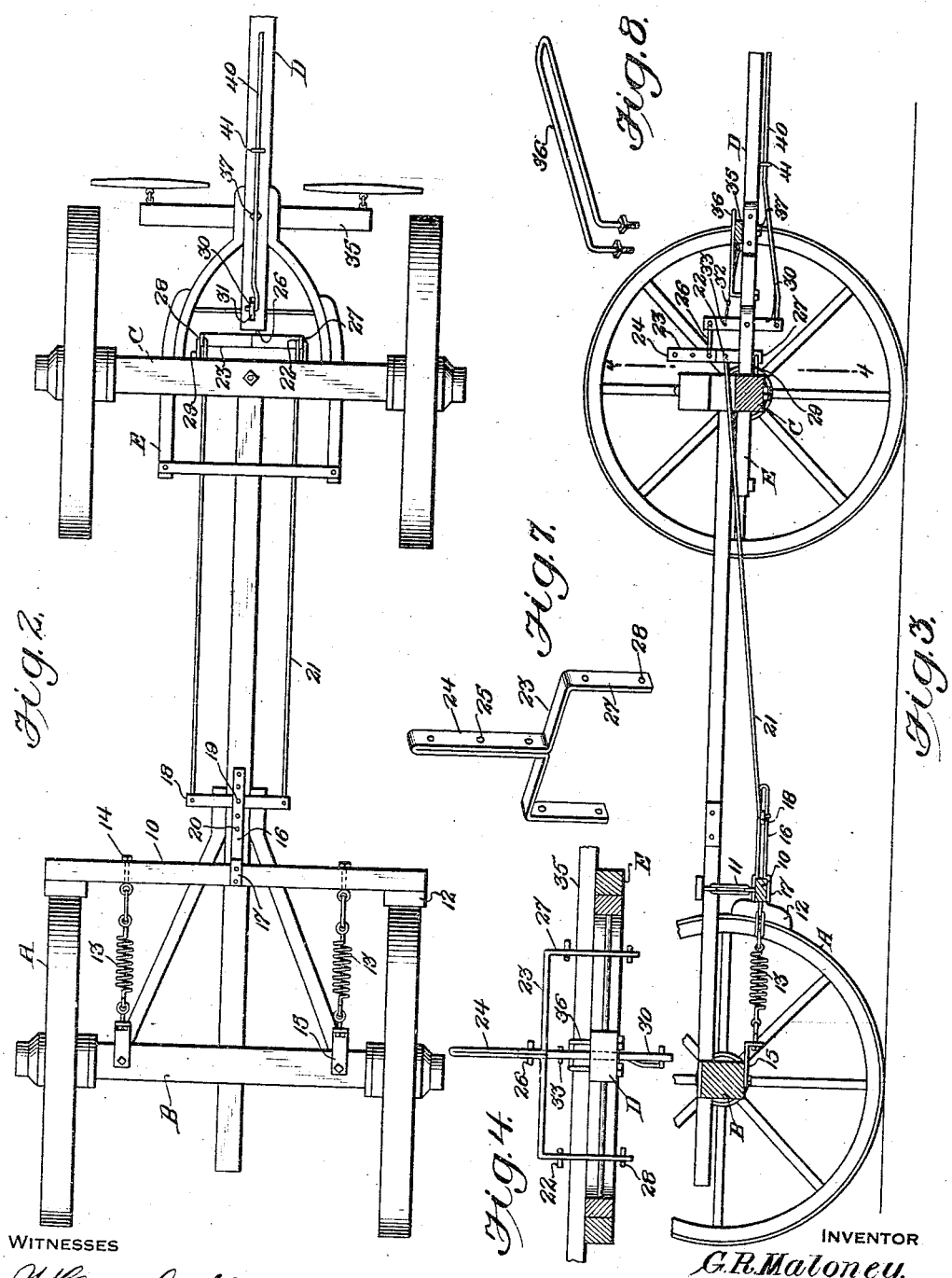

GILBERT R. MALONEY, OF HOLDEN, MISSOURI.

AUTOMATIC BRAKE.

1,244,354.

Specification of Letters Patent.

Patented Oct. 23, 1917.

Application filed March 20, 1917. Serial No. 156,154.

*To all whom it may concern:*

Be it known that I, GILBERT R. MALONEY, a citizen of the United States, residing at Holden, in the county of Johnson and State of Missouri, have invented new and useful Improvements in Automatic Brakes, of which the following is a specification.

This invention relates to automatic brakes especially designed for use in connection with horse drawn wheeled vehicles.

The primary object of the invention is the provision of a braking apparatus of the above class in which the brakes are normally held in engagement with the wheels of the vehicle and are automatically released by the forward movement of the draft animals.

Another object of the invention is the provision of automatic braking means which has included therein means for automatically releasing the brakes when it is desired to back the vehicle, novel means being provided whereby the brake releasing apparatus is connected with the pole straps, so that a forward movement of the draft animals will act to release the brakes.

A further object of the invention is to provide an equalizing means included in the brake mechanism, so that turning the front axle will not affect the brakes.

A still further object is the provision of a braking apparatus in which means is provided for regulating the amount of the pull required for releasing the brake, means being also provided for taking the jar off the wagon beam in the event of a sudden descent, said means permitting of the easy and gradual application of the brakes.

With these and other objects in view the invention consists in the following novel combination and arrangement of parts, hereinafter more fully described, illustrated in the accompanying drawings and pointed out in the appended claim.

In the drawings:—

Figure 1 is a top plan view of the running gear of a vehicle with the invention applied thereto;

Fig. 2 is a bottom plan view of the same;

Fig. 3 is a side elevation of the same with the near wheels removed;

Fig. 4 is a detailed cross sectional view on the line 4—4 of Fig. 3;

Fig. 5 is a detailed perspective view of the strap connected to the brake beam and in which the pivoted equalizer bar is mounted.

Fig. 6 is a detailed perspective view of the means for connecting the double trees with the brake releasing mechanism;

Fig. 7 is a simlar view of the pivotally mounted spring adjusted members; and

Fig. 8 is a like view of the link connecting the double trees with the vehicle tongue.

Fig. 9 is a longitudinal sectional view of the invention.

Referring to the drawings in detail the invention is shown as applied to the running gear of a double horse wheeled vehicle. The wheels of the vehicle are shown at A, the rear axle at B, the front axle at C, the tongue at D and the front hounds at E.

In its practical form the invention includes the brake beam 10 which may be of any preferred construction and is mounted beneath the rear hounds of the vehicle by the links 11, the said beam being provided at each end with brake shoes 12 in the usual manner. Springs 13 are secured at one end to the brake beam as shown at 14 and have their opposite ends secured to the rear axle B by means of the angle plates 15, these springs serving to normally force the brakes into active position with the wheels of the vehicle.

Secured to the beam 10 is a strap doubled upon itself to form a loop 16 and having its free ends spaced apart to receive said beam as shown at 17. Pivotally secured within the loop 16 is a centrally pivoted equalizer bar 18, the pivot of which is shown at 19 and is adapted to be inserted in any one of a series of openings 20 as shown. Pivotally secured to each end of the bar 18 are connecting rods 21, the opposite ends of these rods passing over the top upon the axle C and being pivotally secured as shown at 22 to a pivotally mounted lever 23. This lever 23 is shown in detail in Fig. 7 and comprises a vertical arm 24 provided with apertures 25 adapted to receive a link 26 hereinafter explained. The lever 23 is forked to provide spaced arms 27, which are pivotally mounted as at 28 upon studs 29 projecting from the front face of the front axle C.

The link 26 has its opposite end pivotally mounted within the upper end of a lever 30, which is pivoted within a slot 31 formed in the tongue D. A chain 32 is secured to the lever 30 as shown at 33, the opposite end of the chain being engaged with a staple 34 secured centrally of the double trees 35.

Secured to the tongue D is a loop 36 which extends forward over the top of the double trees 35 and is adapted to receive the usual bolt 37 for connecting the double trees to the tongue D. This bolt 37 is received within the slot 38 formed in the tongue D, so as to provide a limited longitudinal movement of the double trees with respect to the tongue.

From the foregoing it will be apparent that when the draft animals are secured to the vehicle, a forward movement of the animals will cause the traces to pull the double trees forward and through the connection previously described cause the disengagement of the brake shoes from the vehicle wheels. As will be seen as these traces become slack when descending a grade, or for other reasons, the springs 13 will act to force the brakes into active position with the wheels, the application of the brakes being gradual as provided for by the slack of the traces. By adjusting the link 26 in the openings 25, the leverage may be regulated, so as to cause more or less pull to be required for the release of the brakes.

In order to provide for the automatic release of the brakes when it is desired to back the vehicle, the lever 13 has pivotally secured to its lower end the rod 40 which is slidably mounted in eyes 41 secured beneath the pole D. The forward end of this rod is formed with an eye 42 which has secured therein rings 43 for connection with the pole straps of the draft animals.

As soon as the animals have backed sufficiently the pole straps will cause the rearward movement of the rod 40 and through its connection with the lever 30 will pull forward the rods 21 and release the brakes.

From the foregoing description when taken in connection with the accompanying drawings it will be seen that the invention provides a sure and positive automatic brake which will be applied so as to prevent the vehicle from riding or creeping upon the draft animals and that the equalizer bar will provide for the even application of the brakes on turning the vehicle.

Having described the invention what I claim, is;

An automatic braking apparatus for animal drawn vehicles, comprising a spring operated brake, means whereby the pull of the animal will release said brake, a pair of vertically disposed pivoted arms provided with openings, said arms being included in the brake releasing means and a link adjustably connecting said arms, whereby the pull necessary to release the brakes may be regulated.

In testimony whereof I affix my signature.

GILBERT R. MALONEY.